United States Patent
Cho et al.

(10) Patent No.: US 11,182,485 B2
(45) Date of Patent: Nov. 23, 2021

(54) IN-VEHICLE APPARATUS FOR EFFICIENT REPROGRAMMING AND CONTROLLING METHOD THEREOF

(71) Applicants: HYUNDAI MOTOR COMPANY, Seoul (KR); KIA MOTORS CORPORATION, Seoul (KR); Hyundai AutoEver Corp., Seoul (KR)

(72) Inventors: A Ram Cho, Suwon-si (KR); Ho Jin Jung, Seoul (KR); Hyun Soo Ahn, Seoul (KR); Young Jun Lee, Anyang-si (KR); Dae Young Kim, Seongnam-si (KR)

(73) Assignees: Hyundai Motor Company, Seoul (KR); Kia Motors Corporation, Seoul (KR); Hyundai Autoever Corp., Seoul (KR)

( * ) Notice: Subject to any disclaimer, the term of this patent is extended or adjusted under 35 U.S.C. 154(b) by 221 days.

(21) Appl. No.: 15/825,978

(22) Filed: Nov. 29, 2017

(65) Prior Publication Data
US 2019/0034637 A1    Jan. 31, 2019

(30) Foreign Application Priority Data
Jul. 31, 2017    (KR) .......................... 10-2017-0096914

(51) Int. Cl.
*G06F 21/57*    (2013.01)
*H04L 29/06*    (2006.01)
(Continued)

(52) U.S. Cl.
CPC ............ *G06F 21/572* (2013.01); *G06F 8/654* (2018.02); *G06F 9/4401* (2013.01);
(Continued)

(58) Field of Classification Search
CPC ...... G06F 21/572; G06F 8/654; G06F 9/4401; G06F 9/44547; H04L 9/0869;
(Continued)

(56) References Cited

U.S. PATENT DOCUMENTS 9,215,228 B1 * 12/2015  Zhang .................... H04L 9/321
2013/0261839 A1  10/2013  Meyer
(Continued)

FOREIGN PATENT DOCUMENTS

KR    10-2006-0111759 A    10/2006
KR       10-0675646 B1      1/2007
(Continued)

OTHER PUBLICATIONS

Korean Office Action dated Jul. 10, 2021 issued in Korean Patent Application No. 10-2017-0096914.

*Primary Examiner* — Samson B Lemma
*Assistant Examiner* — Zoha Piyadehghibi Tafaghodi
(74) *Attorney, Agent, or Firm* — Morgan, Lewis & Bockius LLP

(57) ABSTRACT

A reprogramming method of a vehicle includes authenticating a diagnostor; receiving integrated firmware comprising a plurality of firmwares that correspond to a plurality of target controllers, respectively, from the diagnostor that is completely authenticated; authenticating the integrated firmware; encrypting and storing the plurality of firmwares included in the integrated firmware; and generating encryption keys that corresponds the plurality of target controllers, respectively apparatus. The encrypting and storing comprises encrypting and storing the plurality of firmwares to the encryption keys that correspond to the plurality of firmwares, respectively.

17 Claims, 8 Drawing Sheets

(51) Int. Cl.
  *G06F 9/4401* (2018.01)
  *H04L 9/08* (2006.01)
  *H04L 9/32* (2006.01)
  *G06F 8/654* (2018.01)
  *G06F 9/445* (2018.01)
  *H04W 4/48* (2018.01)

(52) U.S. Cl.
  CPC ........ *G06F 9/44547* (2013.01); *H04L 9/0869* (2013.01); *H04L 9/0894* (2013.01); *H04L 9/3242* (2013.01); *H04L 9/3247* (2013.01); *H04L 63/0281* (2013.01); *H04L 63/08* (2013.01); *H04L 63/126* (2013.01); *H04L 2209/84* (2013.01); *H04W 4/48* (2018.02)

(58) Field of Classification Search
  CPC ... H04L 9/0894; H04L 9/3242; H04L 9/3247; H04L 63/0281; H04L 63/08; H04L 63/126; H04L 2209/84; H04W 4/48
  See application file for complete search history.

(56) References Cited

U.S. PATENT DOCUMENTS

| | | | |
|---|---|---|---|
| 2015/0121070 A1* | 4/2015 | Lau | H04L 63/0823 713/164 |
| 2015/0180840 A1* | 6/2015 | Jung | H04L 67/34 713/150 |
| 2015/0200804 A1* | 7/2015 | Lee | H04L 67/12 709/221 |
| 2015/0301821 A1* | 10/2015 | Danne | H04L 67/06 717/169 |
| 2016/0013934 A1* | 1/2016 | Smereka | G06F 21/572 713/171 |
| 2016/0099806 A1* | 4/2016 | Racklyeft | H04L 9/0866 380/281 |
| 2016/0147525 A1 | 5/2016 | Choi | |
| 2016/0173505 A1* | 6/2016 | Ichihara | H04L 67/12 713/170 |
| 2016/0313715 A1 | 10/2016 | Fischer et al. | |
| 2017/0093866 A1* | 3/2017 | Ben-Noon | H04L 9/3234 |
| 2017/0134164 A1* | 5/2017 | Haga | B60R 16/023 |
| 2017/0134382 A1* | 5/2017 | Darnell | H04W 12/041 |
| 2017/0192770 A1* | 7/2017 | Ujiie | G06F 8/654 |

FOREIGN PATENT DOCUMENTS

| | | |
|---|---|---|
| KR | 10-2008-0082868 A | 9/2008 |
| KR | 10-0872849 B1 | 12/2008 |
| KR | 10-1328167 B1 | 11/2013 |
| KR | 10-1527779 B1 | 6/2015 |
| KR | 10-2015-0136350 A | 12/2015 |

* cited by examiner

FIG. 1
-Prior Art-
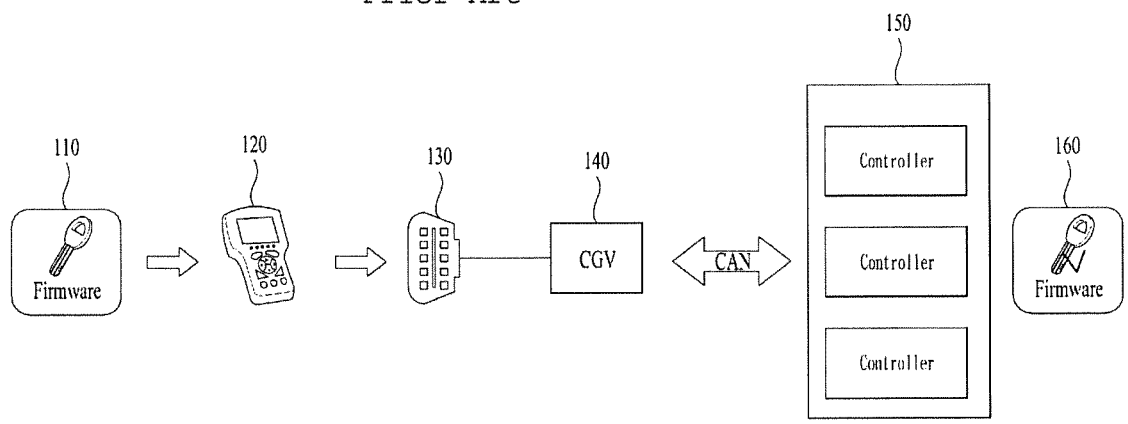
FIG. 2A
-Prior Art-
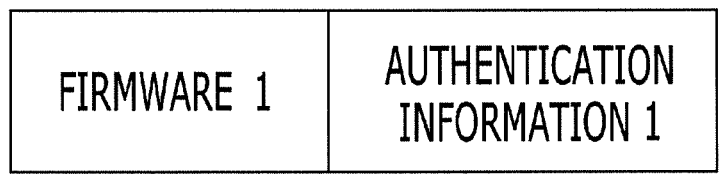
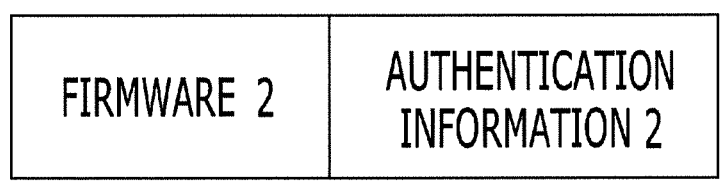
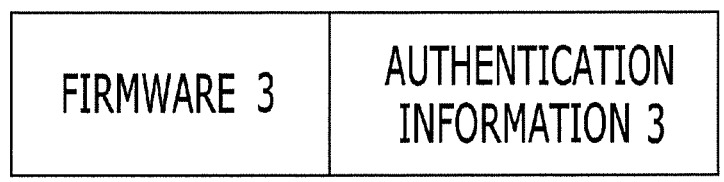

FIG. 5

FIRMWARE UPDATE MESSAGE

| Header | Firmware 1 | Firmware 2 | Firmware 3 | Firmware X | Signature |

| Header | HEADER VERSION, INTEGRATED FIRMWARE IDENTIFICATION INFORMATION, FIRMWARE NUMBER, CORRESPONDING CONTROLLER IDENTIFICATION (ID) FOR EACH FIRMWARE, LENGTH, FIRMWARE VERSION, ETC. |

| Header | FIRMWARE CONTENT |

| Header | SIGNATURE VALUE OF EACH FIRMWARE INCLUDING HEADER
Signature = do_sign(Header, firm1, firm2, firm3, ..., firm X); |

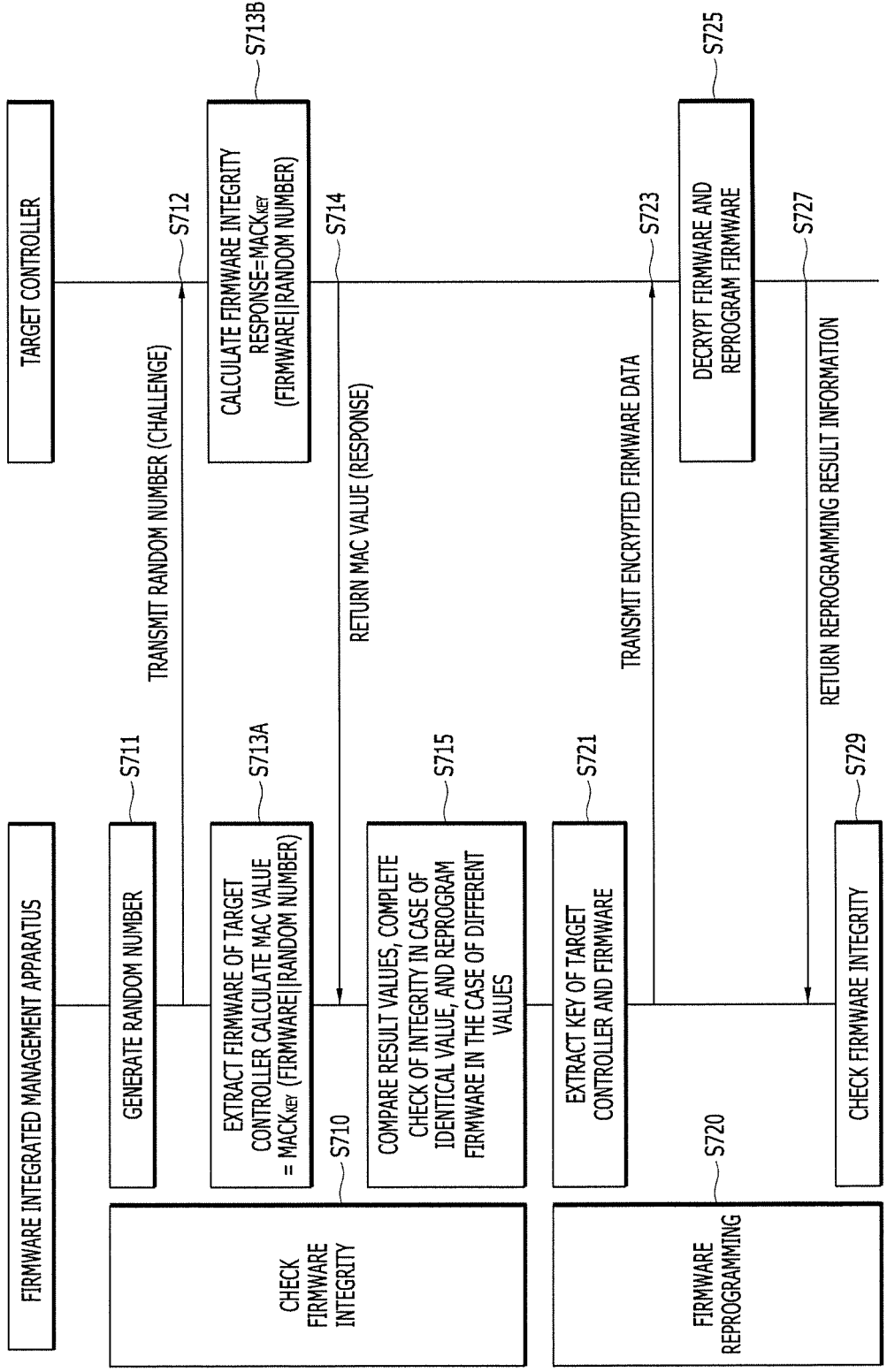

«IN-VEHICLE APPARATUS FOR EFFICIENT REPROGRAMMING AND CONTROLLING METHOD THEREOF

CROSS-REFERENCES) TO RELATED APPLICATIONS

This application claims the benefit of priority to Korean Patent Application No. 10-2017-0096914, filed on Jul. 31, 2017, which is hereby incorporated by reference as if fully set forth herein.

TECHNICAL FIELD

The present disclosure relates to reprogramming of a controller for a vehicle, and more particularly, to a gateway for efficient reprogramming for a plurality of controllers and a controlling method thereof.

BACKGROUND

Recent vehicles are configured in such a way that most nodes of a vehicle network includes an electronic control unit (ECU) for control of electronic components and chassis components, such as body control module/electronic time & alarm control system (BCM/ETACS), an anti-lock brake system (ABS) ECU, an engine ECU, and an air bag ECU. These ECUs are provided with a vehicle diagnosis service for safe and economical vehicle driving to prevent a car trouble thereby and provided with various vehicle information items such as vehicle driving record management and statistical information. In addition, the ECUs are also provided with software upgrade, i.e., reprogramming as necessary, for example, to change specifications and upgrade a functions, which will be described with reference to FIG. 1.

FIG. 1 is a diagram illustrating an example of a reprogramming procedure in a general vehicle.

Referring to FIG. 1, latest firmware 110 is transmitted to a target controller as an upgrade target among controllers 150 in the vehicle through a diagnostor 120, a diagnostor connector 130 of the vehicle, and a central gateway (CGW) 140. The target controller verifies a diagnostor through a predetermined procedure, authenticates firmware, and performs upgrade by using firmware 160 that is completely authenticated. Here, the diagnostor connector 130 of the vehicle is connected to an on-board diagnostics (OBD) 2 node of the vehicle.

In this procedure, a security solution such as a firmware signing tool (FST) and a standard reprogramming tool (SRT) is used for firmware security of a controller. The FST is a tool for authentication of firmware of a controller to obtain approval of a vehicle manufacturer through a predetermined procedure. Without approval of the vehicle manufacturer, firmware is not capable of being authenticated, and thus, fabricated firmware is prevented from being injected into the controller. The SRT is a tool for approval for access to a corresponding controller to allow only an owner of authentication certificate and an encryption key to be authorized with reprogramming, for firmware reprogramming.

However, due to increase in the number of vehicle controllers and technology elaboration, controllers are highly associated, and thus, a plurality of controllers need to be updated with respect to a common technology/function. For example, a function of a smart cruise control (SCC) is associated with a plurality of controllers such as an engine controller, a brake controller, and a sensor controller. However, firmware of a general controller is upgraded by reprogramming firmware according to one to one correspondence of a diagnostor and a controller. This procedure will be described with reference to FIG. 2.

FIGS. 2A to 2C are diagrams for explanation of an example of a reprogramming procedure between a diagnostor and a controller in a general vehicle.

Referring to FIG. 2A, firmwares for three respective controllers are prepared. Here, authentication information that is separately calculated for firmware for each controller is accompanied. That is, when three firmwares are present, the number of authentication information is also 3.

When controllers are simultaneously updated using the firmwares, a reprogramming request is transmitted to any one of controllers corresponding to the firmwares prepared by a diagnostor, as shown in FIG. 2B (S210). Accordingly, a corresponding controller transmits a seed value to the diagnostor (S220). The diagnostor may calculate a key value via a predetermined method (bit calculation, encryption, etc.) using the seed value and return the key value to the controller (S230). The controller calculates a key value via a predetermined method using the seed value transmitted to the diagnostor, and then, compares the calculated key value with the key value received from the diagnostor to authenticate the diagnostor (S240). Upon completing verification of the diagnostor, the controller transmits a verification message to the diagnostor (S250) and the diagnostor transmits firmware and authentication information (S260). The controller authenticates firmware by determining whether authentication information calculated through the received firmware and the received authentication information are identical to each other (S270).

The procedure described with reference to FIG. 2B needs to be performed by each controller. For example, assuming that N controllers and N firmwares are present as shown in FIG. 2C, each firmware needs to acquire a signature from a security manager, to separately transmit the signature to a controller in a vehicle through a firmware injection device (diagnostor), and to be authenticated by each controller. Lastly, when operations S210 to S270 of FIG. 2B are repeatedly performed on all of firmwares 1 to N with respect to different controllers, N firmwares are completely updated.

Due to this problem, in particular, when a plurality of firmwares associated with one function are updated, even if the same diagnostor is used, the aforementioned reprogramming procedure needs to be repeatedly performed for each firmware to update each firmware, and thus, there is a problem in that efficiency is degraded, that firmware installed in a controller is not re-authenticated after reprogramming, and that firmware is capable of being re-installed by re-connecting the diagnostor when a problem occurs.

SUMMARY

An object of the present disclosure is to provide an apparatus for efficient reprogramming and a controlling method thereof.

In particular, an object of the present disclosure is to provide an apparatus for efficient reprogramming for a plurality of controllers and a controlling method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a reprogramming method of a vehicle includes authenticating a diagnostor by a gateway, receiving integrated firmware including a plurality of firmwares that correspond to a plurality of target controllers, respectively, from the diagnostor that is completely authenticated, by a firmware integrated management apparatus, authenticating the integrated firmware by the firmware integrated management apparatus, encrypting and storing the plurality of firmwares included in the integrated firmware by the firmware integrated management apparatus, and generating encryption keys that corresponds the plurality of target controllers, respectively, by the firmware integrated management apparatus, wherein the encrypting and storing includes encrypting and storing the plurality of firmwares to the encryption keys that correspond to the plurality of firmwares, respectively.

In another aspect of the present disclosure, a vehicle includes a plurality of controllers, a gateway configured to authenticate a diagnostor, and a firmware integrated management apparatus configured to, upon receiving integrated firmware including a plurality of firmwares that correspond to a plurality of target controllers, respectively, among the plurality of controllers, from the diagnostor that is completely authenticated, authenticate the integrated firmware, and encrypt and store the plurality of firmwares included in the integrated firmware, wherein the firmware integrated management apparatus generates encryption keys that corresponds the plurality of target controllers, respectively and encrypts and stores the plurality of firmwares to the encryption keys that correspond to the plurality of firmwares, respectively.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram illustrating an example of a reprogramming procedure in a general vehicle;

FIGS. 2A to 2C are diagrams for explanation of an example of a reprogramming procedure between a diagnostor and a controller in a general vehicle;

FIG. 5 is a diagram illustrating an example of format of a firmware update message according to an embodiment of the present disclosure;

FIG. 7 is a flowchart showing an example of a procedure in which a firmware integrated management apparatus checks and restores firmware installed in a separate controller according to an embodiment of the present disclosure.

DETAILED DESCRIPTION

Figure 2B:
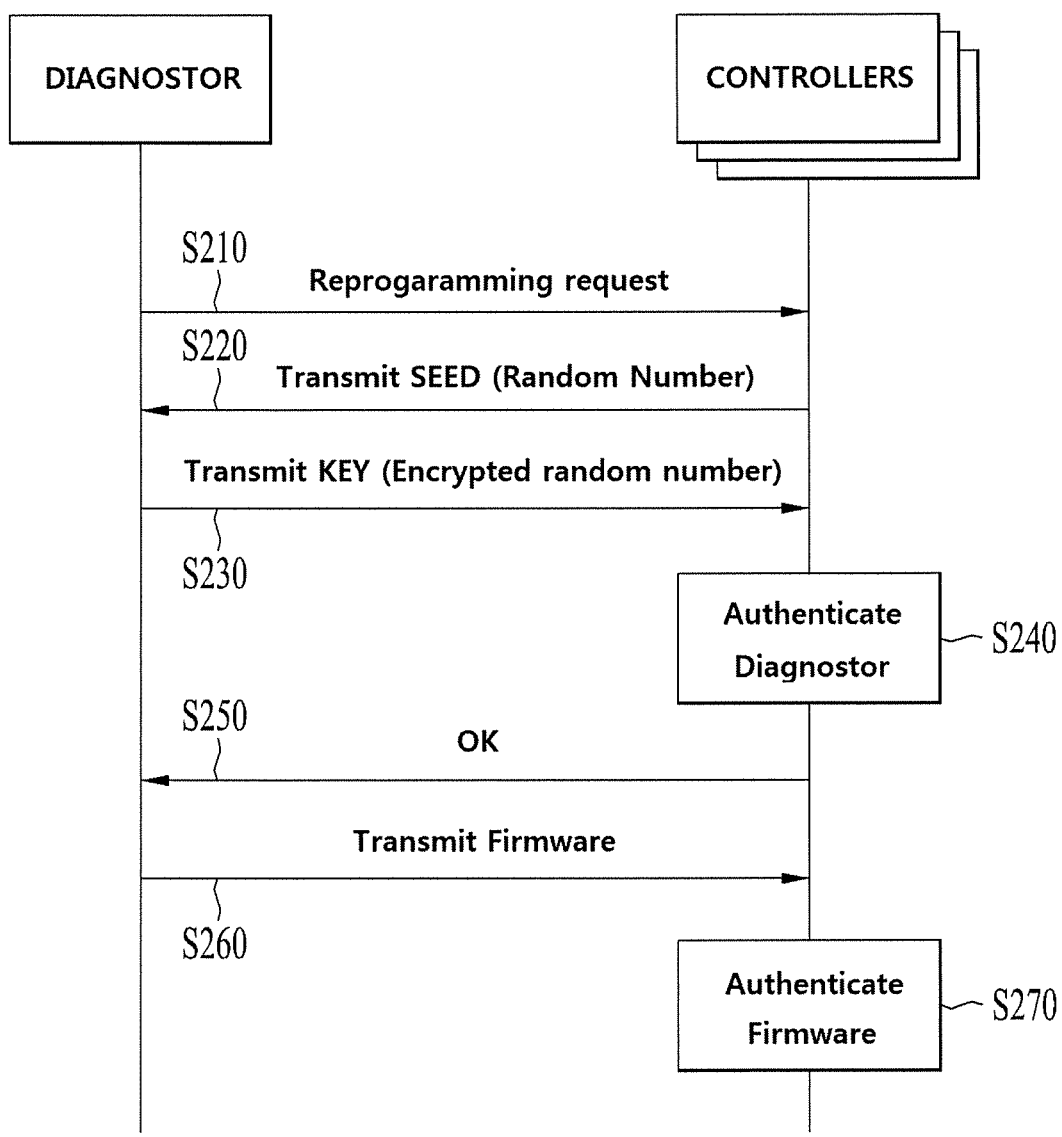
Figure 2C:
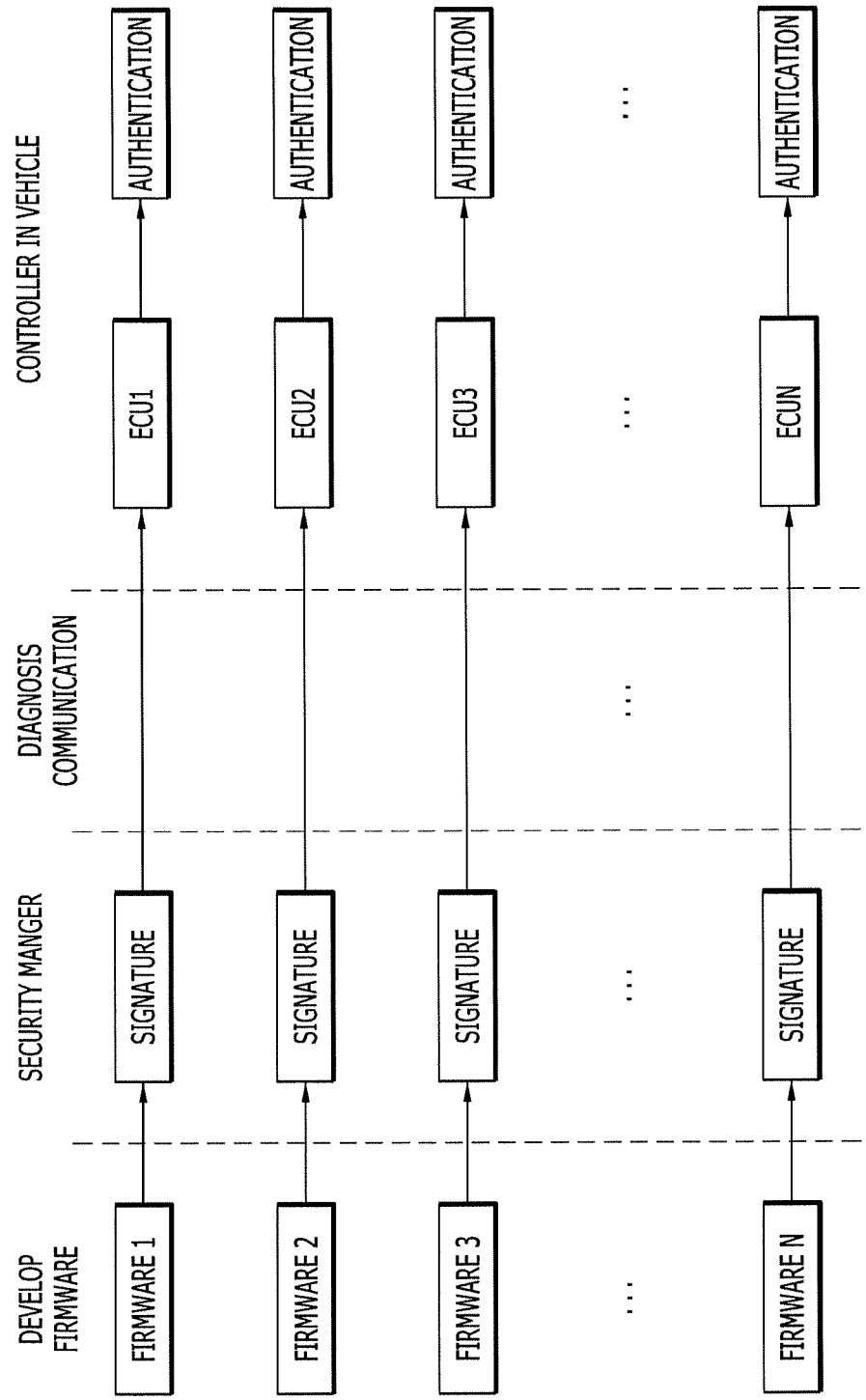

Exemplary embodiments of the present disclosure are described in detail so as for those of ordinary skill in the art to easily implement with reference to the accompanying drawings. However, the present disclosure may be implemented in various different forms and is not limited to these embodiments. To clearly describe the present disclosure, a part without concerning to the description is omitted in the drawings, and like reference numerals in the specification denote like elements.

Throughout this specification, unless explicitly described to the contrary, the word "comprise" and variations such as "comprises" or "comprising", will be understood to imply the inclusion of stated elements but not the exclusion of any other elements. In addition, the same reference numbers will be used throughout the drawings to refer to the same or like parts.

According to an embodiment of the present disclosure, integrated firmware including a plurality of firmwares is transmitted to a vehicle and the vehicle includes a separate object (hereinafter, referred to as a "firmware integrated management apparatus") for authenticating and managing integrated firmware.

To this end, according to an embodiment of the present disclosure, one information item is used for entire integrated firmware instead of authentication information items corresponding to respective firmwares included in the integrated firmware. In addition, according to an embodiment of the present disclosure, authentication for a diagnostor is performed by a gateway and authentication for an integrated firmware and management of a plurality of firmwares included in the integrated firmware are performed by a firmware integrated management apparatus. Here, management of firmware may include a backup function, a firmware delivery function for a separate controller, an integrity management function for firmware that is completely reprogrammed, and a restoration function of a controller when firmware integrity is damaged.

First, a firmware update concept according to an embodiment of the present disclosure will be described with reference to FIG. 3.

Figure 3:
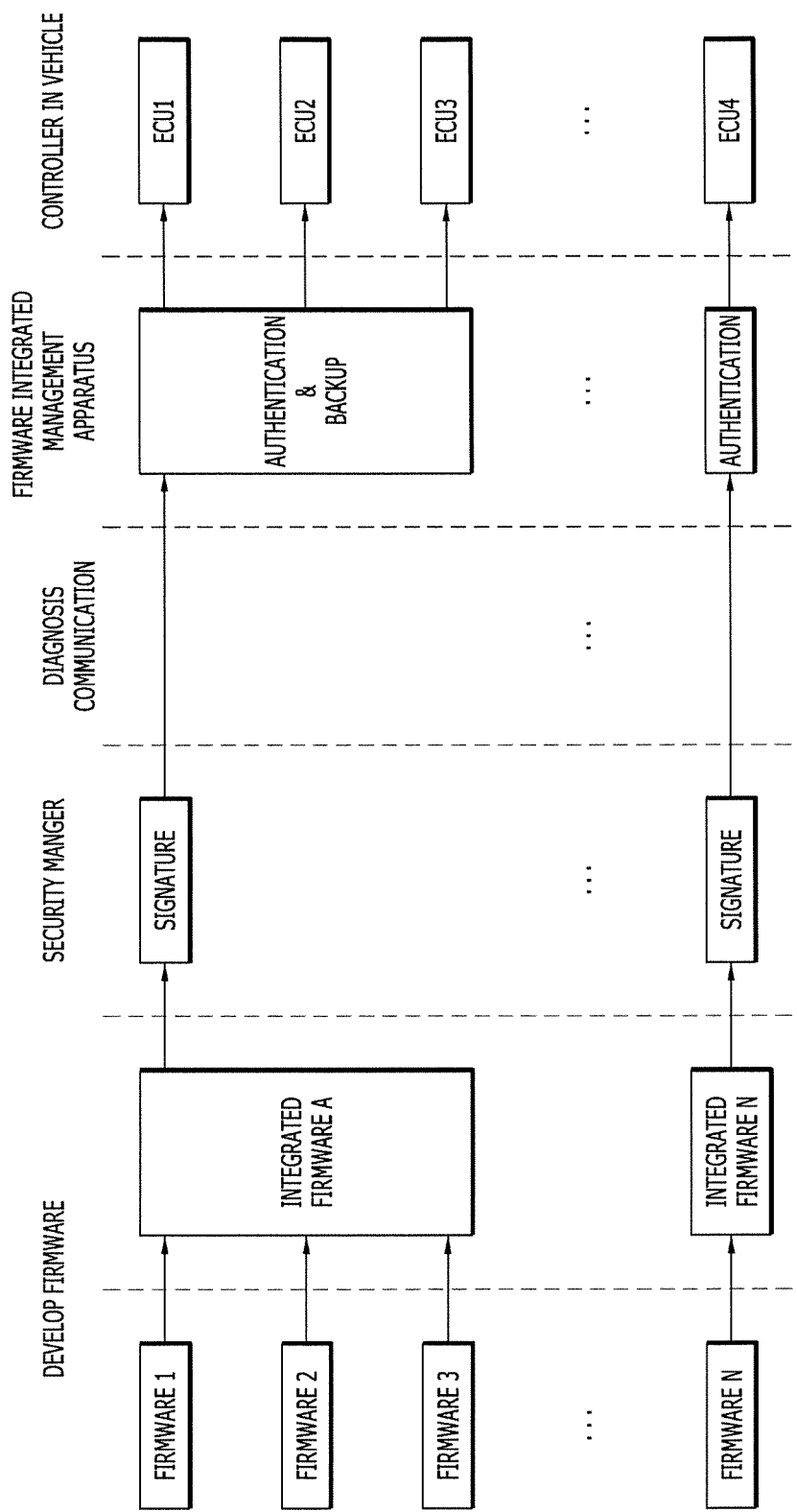
FIG. 3 is a diagram for explanation of a concept of an update procedure using integrated firmware and firmware integrated management apparatus according to an embodiment of the present disclosure.

FIG. 3 is a diagram for explanation of a concept of an update procedure using integrated firmware and firmware integrated management apparatus according to an embodiment of the present disclosure.

Referring to FIG. 3, when a plurality of firmwares are prepared in a firmware developing operation, a plurality of firmwares may be combined to one integrated firmware. For example, firmware 1, firmware 2, and firmware 3 may be included with integrated firmware A. A reference of firmware included in one integrated firmware may be a controller involved in a function (e.g., smart cruise control, front crash prevention, lane departure warning, etc.) implemented in the vehicle or an update data and may be exemplary, and thus, the present disclosure may not be limited to a reference of firmware included in one integrated firmware.

In a next security manager operation, authentication may be performed in units of one integrated firmware including separate firmwares instead authentication of separate firmware. Accordingly, the integrated firmware may include signature information.

The integrated firmware including the signature information may be transmitted to a vehicle via diagnosis communication and a firmware integrated management apparatus of the vehicle may authenticate and backup the transmitted integrated firmware. Here, the authentication may be performed in units of integrated firmwares by using the signature information included in the integrated firmware. The firmware integrated management apparatus may divide the integrated firmware into separate firmwares and then encrypt and store the separate firmwares during the backup, and in this case, may generate an encryption key corresponding to each controller and use the encryption key to encrypt firmware.

Upon completing authentication and backup, the firmware integrated management apparatus may transmit the encryption key and firmware corresponding to a separate controller to the corresponding separate controller and the separate controller may perform reprogramming on the received firmware and transmit the result to the firmware integrated management apparatus. In this case, the firmware integrated management apparatus may transmit encrypted firmware data to the separate controller or may decrypt the encrypted firmware before being transmitted and transmit the firmware to the separate controller in the form of plain text. When the encrypted firmware data is transmitted, the corresponding controller may decrypt the encrypted firmware data by using the acquired encryption key with the firmware data.

When the aforementioned method is used, the number of signatures and a number of times of authentication may be reduced by integrating a plurality of firmwares instead of performing signature and authentication in units of separate firmwares, thereby simplifying an update operation and a signature and authentication load to the separate controller may be moved to the integrated management apparatus to reduce burden to the controller.

Hereinafter, a structure of a firmware update system according to an embodiment of the present disclosure will be described with reference to FIG. 4.

Figure 4:
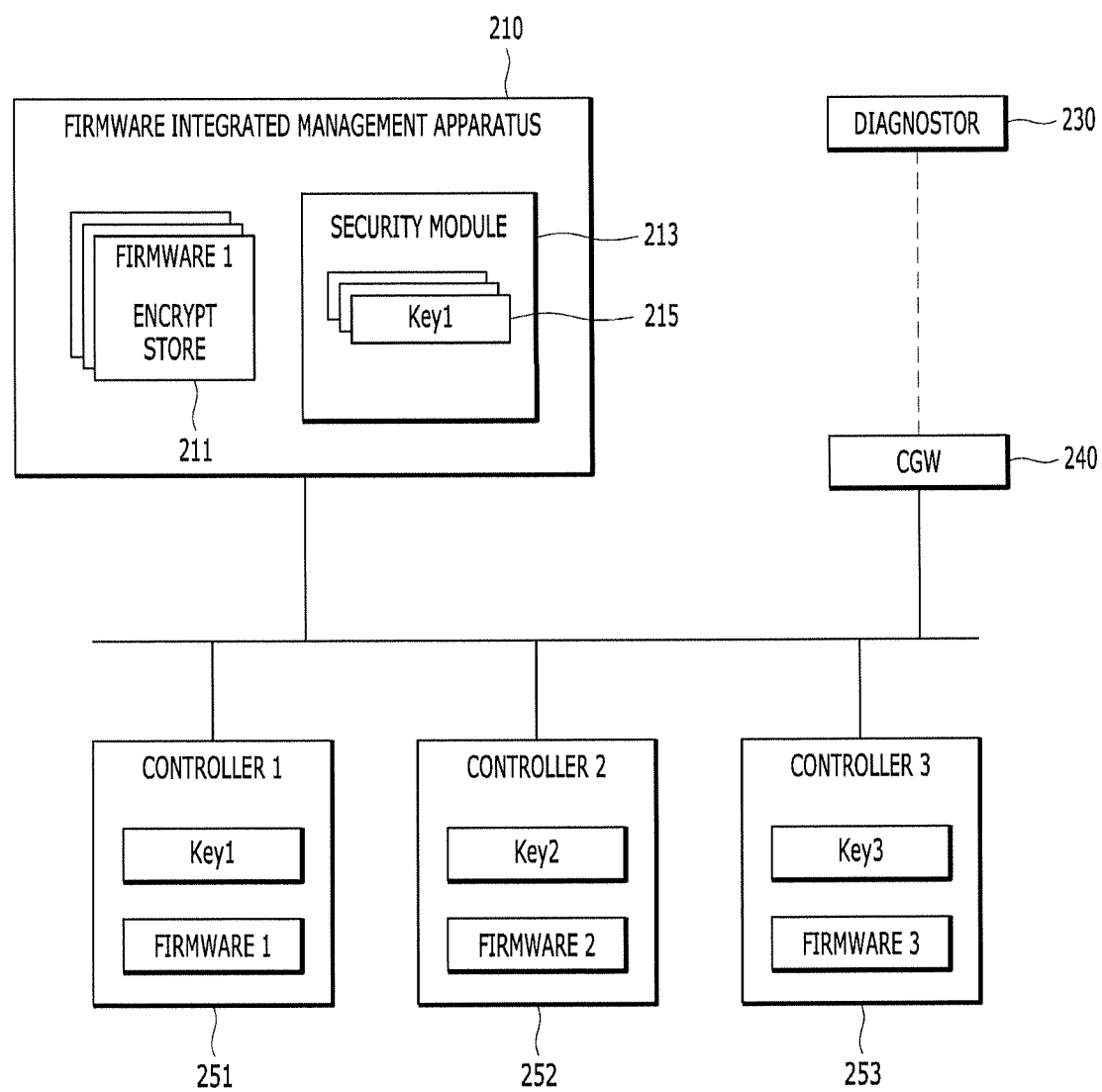
FIG. 4 is a block diagram illustrating a structure of a firmware update system according to an embodiment of the present disclosure.

FIG. 4 is a block diagram illustrating a structure of a firmware update system according to an embodiment of the present disclosure.

Referring to FIG. 4, the firmware update system may be divided into a vehicle part and a non-vehicle part. In FIG. 4, a diagnostor 230 may correspond to the non-vehicle part and the remaining components may correspond to the vehicle part.

In more detail, the diagnostor 230 may be connected to a central gateway (CGW) of a vehicle via diagnosis communication (e.g., OBD-2) and the CGW 240 may be connected to a firmware integrated management apparatus 210 and separate controllers 251, 252, and 253 through a data path (e.g., CAN BUS).

The diagnostor 230 may have a function of injecting new integrated firmware to the vehicle and access the firmware integrated management apparatus 210 after being authenticated by the CGW 240.

The CGW 240 may be a gateway for access to a vehicle network from the outside of the vehicle and may authenticate the diagnostor 230.

The firmware integrated management apparatus 210 may encrypt and store firmwares 211 of the respective controllers. The firmware integrated management apparatus 210 may include encryption keys 215 for the respective controllers for ensuring data integrity and confidentiality or a security module 213 for separately storing authentication data. To this end, the firmware integrated management apparatus 210 may include a memory and a region for storing the firmwares 211 of the respective controllers and a region allocated to the security module 213 may be logically or physically separated from each other. The firmware integrated management apparatus 210 may include processing modules corresponding to respective functions such as authentication, encryption, and backup of integrated firmware, and integrity check of firmwares for respective controllers, and in some embodiments, may include softwares corresponding to respective processing modules and a processor for driving/calculating the software.

Each of the controllers 251, 252, and 253 may store the encryption keys and firmwares corresponding to the respective controllers and decrypt the encrypted firmware by using the encryption key or may autonomously check firmware integrity through a predetermined algorithm (e.g., Hmac, sha, etc.). In this case, to check firmware integrity, random numbers transmitted from the firmware integrated management apparatus 210 may be used and the check result may be re-transmitted to the firmware integrated management apparatus 210, which will be described in more detail with reference to FIG. 7.

Hereinafter, the form in which integrated firmware is transmitted will be described with reference to FIG. 5.

FIG. 5 is a diagram illustrating an example of format of a firmware update message according to an embodiment of the present disclosure.

As shown in FIG. 5, the integrated firmware may be transmitted to a vehicle from a diagnostor in the form of firmware update message. The firmware update message may include a header, a plurality of firmware data (Firmware 1, Firmware 2, Firmware 3, Firmware X, etc.) and signature information (Signature).

Here, the header may perform a header function of a message, and here, include at least one of a header version including version information of the header, integrated firmware identification information for identifying integrated firmware from other integrated firmware, firmware number information included in a corresponding message, controller identification (ID) information corresponding to each firmware, message length information, and version information of separate firmware.

The signature information may be authentication information indicating a signature value of each firmware including a header and represented in the form of, for example, "signature=do_sign(Header, firm1, firm2, firm3, . . . , firm x);".

Due to use of the aforementioned form of update message, security intensity, an authentication element, an authentication method, and so on for each integrated firmware may be ranged and managed. When firmwares are integrated, the number of firmwares to be original equipment manufacturer (OEM)-managed by a security manager and a vehicle manufacturer may be reduced depending on a controller software manufacturer, thereby improving management efficiency. In addition, if firmwares are integrated depending on a controller operating function, controllers involved in a corresponding function may be simultaneously updated when a plurality of controllers are updated depending on an added or changed vehicle function, and it may be easy to manage a version when the controllers are integrated and managed depending on a data/time.

Hereinafter, a firmware update procedure will be described in more detail with reference to FIG. 6.

Figure 6:
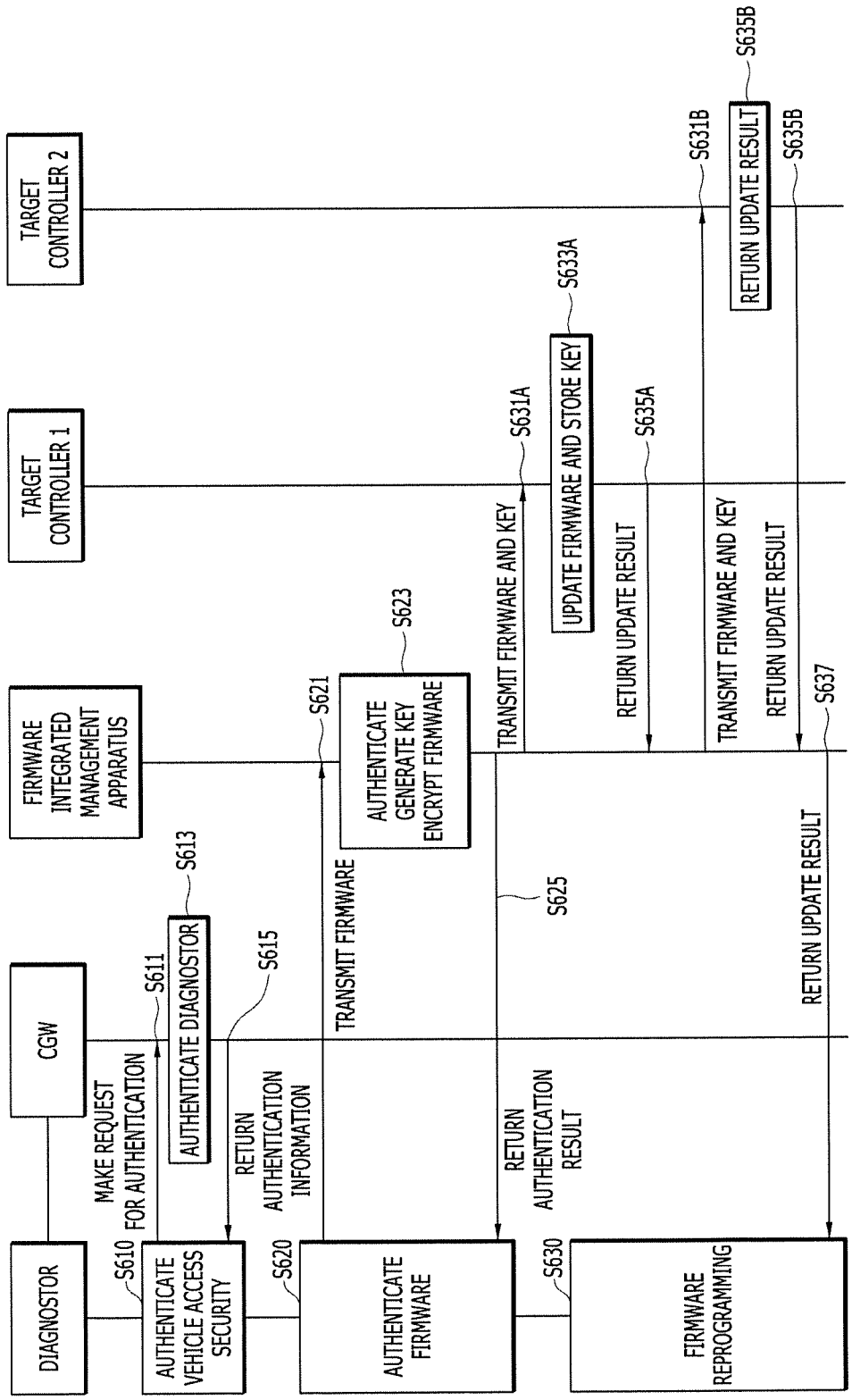
FIG. 6 is a flowchart illustrating an example of integrated firmware and a firmware update procedure through a firmware integrated management apparatus according to an embodiment of the present disclosure.

FIG. 6 is a flowchart illustrating an example of integrated firmware and a firmware update procedure through a firmware integrated management apparatus according to an embodiment of the present disclosure. In FIG. 6, integrated firmware is assumed to include two firmwares that correspond to controller 1 and controller 2, respectively.

Referring to FIG. 6, the update procedure may largely include a vehicle access security authentication operation S610 performed between a diagnostor and a vehicle gateway, a firmware authentication operation S620 in which a firmware integrated management apparatus receives integrated firmware and performs update pre-processing, and a firmware reprogramming operation S630 in which actual reprogramming is performed. Hereinafter, each operation will be described in detail.

First, the vehicle access security authentication operation S610 will be described now.

The diagnostor may be connected to the vehicle and then may transmit an authentication request to a central gateway (CGW) (S611). Accordingly, the CGW may authenticate the diagnostor (S613), and upon successfully authenticating the diagnostor, the CGW may return authentication information indicating that authentication is completed, to the diagnostor (S615).

In the firmware authentication operation S620, the diagnostor that is successfully authenticated by the CGW may access the firmware integrated management apparatus and transmit integrated firmware to the firmware integrated management apparatus (S621). The firmware integrated management apparatus may authenticate integrated firmware by using signature included in the integrated firmware, and upon successfully authenticating the integrated firmware, the firmware integrated management apparatus may generate an encryption key of diagnostors corresponding to the respective firmwares included in the integrated firmware and encrypt and store the separate firmware by using the generated encryption key (S623). Upon successfully authenticating the integrated firmware, the firmware integrated management apparatus may return the authentication result corresponding thereto to the diagnostor (S625).

In the firmware reprogramming operation S630, first, the firmware integrated management apparatus may transmit the firmwares and encryption keys corresponding to respective controllers, to the controllers (S631A and S631B). Each controller that receives firmware and an encryption key may update the firmware and store the encryption key by using the received firmware (S633A and S633B). Then, upon successfully updating the firmware, each controller may return the update result to the firmware integrated management apparatus (S635A and S635B). Accordingly, the firmware integrated management apparatus may transmit the reprogramming result of entire integrated firmware to the diagnostor (S637).

When reprogramming is completed through the procedure shown in FIG. 6, the firmware integrated management apparatus may also perform post-check and restoration of reprogramming, which will be described below with reference to FIG. 7.

FIG. 7 is a flowchart showing an example of a procedure in which a firmware integrated management apparatus checks and restores firmware installed in a separate controller according to an embodiment of the present disclosure.

Referring to FIG. 7, a management function performed by a firmware integrated management apparatus after firmware update may be largely divided into a firmware integrity check function (S710) and a reprogramming function (S720) for firmware restoration.

First, the integrity check function (S710) may be performed as follows.

First, the firmware integrated management apparatus may generate a random number (S711) and transmit the random number to a target controller (S712). The firmware integrated management apparatus may perform MAC calculation by using the random number, the firmware, and an encryption key for a corresponding controller (S713A), and the target controller may perform MAC calculation by using the received random number, the encryption key received during firmware update, and the firmware installed in the target controller (S713B). The target controller may transmit a MAC value generated as the calculation result to the firmware integrated management apparatus (S714) and the firmware integrated management apparatus may compare the received MAC value and the MAC value generated by the apparatus to determine whether the two values are the same, determine that there is no problem in terms of firmware integrity of the target controller, and otherwise, proceed to the firmware reprogramming (S720) for restoration (S715).

The aforementioned integrity check function may be performed with a predetermined period (a time or vehicle mileage base) or performed based on an event (e.g., when a vehicle is turned on, etc.). The integrity check may be triggered with different periods for respective controllers or depending on an event condition.

Hereinafter, the firmware reprogramming (S720) for restoration will be described.

When there is a problem in terms of firmware integrity (i.e., when MAC values are different), the firmware integrated management apparatus may determine firmware corresponding to a controller with a problem in terms of integrity among encrypted firmwares and encryption keys which are backed up to the apparatus (S721) and transmit the encrypted firmware to a corresponding controller (S723). The controller may decrypt the encrypted firmware data by using a pre-stored encryption key and then perform reprogramming to restore firmware (S725). Upon completing firmware restoration, a corresponding controller may transmit reprogramming result information to the firmware integrated management apparatus (S727). The firmware integrated management apparatus may re-perform the aforementioned firmware integrity check operation (S710) to re-check the reprogramming result (S729).

Although FIG. 7 shows the firmware integrity check and restoration operations for one controller, the firmware integrated management apparatus may perform the firmware integrity check and restoration operations on at least one a partial or entire portion of a separate controller irrespective of the number of controllers that manage the firmware and the encryption key.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

A plurality of controller may be efficiently performed through the firmware integrated management apparatus related to at least one embodiment of the present disclosure configured as described above.

In particular, a plurality of firmwares may be authenticated and managed by the firmware integrated management apparatus by using one authentication information item, and thus, repeated authentication on a controller-by-controller basis may not be required and a size of authentication information may be reduced.

It will be appreciated by persons skilled in the art that that the effects that could be achieved with the present disclosure are not limited to what has been particularly described hereinabove and other advantages of the present disclosure will be more clearly understood from the above detailed description taken in conjunction with the accompanying drawings.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. A reprogramming method of a vehicle, the method comprising:
   authenticating, by a gateway, a diagnostor;
   receiving, by a firmware integrated management apparatus, integrated firmware comprising a plurality of firmwares that correspond to a plurality of target controllers, respectively, from the diagnostor that is completely authenticated;
   authenticating, by the firmware integrated management apparatus, the integrated firmware;
   encrypting and storing, by the firmware integrated management apparatus, the plurality of firmwares included in the integrated firmware;
   generating, by the firmware integrated management apparatus, encryption keys that corresponds the plurality of target controllers, respectively;
   storing the encryption keys in a region of memory physically or logically separated from a region of memory in which the plurality of firmwares included in the integrated firmware are stored; and
   transmitting, by the firmware integrated management apparatus, corresponding encrypted firmware among the plurality of encrypted firmwares along with a corresponding encryption key generated by the firmware integrated management apparatus to each of the plurality of target controllers,
   wherein the encrypting and storing comprises encrypting and storing the plurality of firmwares to the encryption keys that correspond to the plurality of firmwares, respectively.

2. The method according to claim 1, wherein the integrated firmware comprises one authentication information item about all the plurality of firmwares.

3. The method according to claim 2, wherein the integrated firmware is transmitted through the diagnostor in the form of update message; and wherein the update message comprises a header.

4. The method according to claim 3, wherein the header comprises at least one of a header version, integrated firmware identification information, firmware number information indicating the number of the plurality of firmwares, corresponding controller identification information for each firmware, message length information, and separate firmware version information.

5. The method according to claim 1, wherein the encryption keys for the controllers that correspond to the plurality of firmwares, respectively, are stored in a security module of the firmware integrated management apparatus.

6. The method according to claim 1, further comprising, when each of the plurality of target controllers encrypts the firmware transmitted to each of the plurality of target controllers, decrypting the encrypted firmware by using the encryption key transmitted to each of the plurality of target controllers and then performing reprogramming.

7. The method according to claim 1, further comprising periodically checking, by the firmware integrated management apparatus, firmware integrity of each of the plurality of target controllers.

8. The method according to claim 7, further comprising re-transmitting, by the firmware integrated management apparatus, firmware corresponding to a controller with a problem in terms of check of the firmware integrity among the plurality of encrypted firmwares, to the controller with the problem among the plurality of target controllers.

9. A non-transitory computer readable recording medium having recorded thereon a program for executing a method comprising:
   authenticating, by a gateway, a diagnostor;
   receiving, by a firmware integrated management apparatus, integrated firmware comprising a plurality of firmwares that correspond to a plurality of target controllers, respectively, from the diagnostor that is completely authenticated;
   authenticating, by the firmware integrated management apparatus, the integrated firmware;
   encrypting and storing, by the firmware integrated management apparatus, the plurality of firmwares included in the integrated firmware;
   generating, by the firmware integrated management apparatus, encryption keys that corresponds the plurality of target controllers, respectively;
   storing the encryption keys in a region of memory physically or logically separated from a region of memory in which the plurality of firmwares included in the integrated firmware are stored; and
   transmitting, by the firmware integrated management apparatus, corresponding encrypted firmware among the plurality of encrypted firmwares along with a corresponding encryption key generated by the firmware integrated management apparatus to each of the plurality of target controllers,
   wherein the encrypting and storing comprises encrypting and storing the plurality of firmwares to the encryption keys that correspond to the plurality of firmwares, respectively.

10. A vehicle comprising:
    a plurality of controllers;
    a gateway configured to authenticate a diagnostor; and
    a firmware integrated management apparatus configured to, upon receiving integrated firmware comprising a plurality of firmwares that correspond to a plurality of target controllers, respectively, among the plurality of controllers, from the diagnostor that is completely authenticated, authenticate the integrated firmware, and encrypt and store the plurality of firmwares included in the integrated firmware,
    wherein the firmware integrated management apparatus generates encryption keys that corresponds the plurality of target controllers, respectively, and encrypts and stores the plurality of firmwares to the encryption keys that correspond to the plurality of firmwares, respectively,
    wherein the firmware integrated management apparatus stores the encryption keys in a region of memory physically or logically separated from a region of memory in which the plurality of firmwares included in the integrated firmware are stored, and
    wherein the firmware integrated management apparatus transmits corresponding encrypted firmware among the plurality of encrypted firmwares along with a corresponding encryption key generated by the firmware integrated management apparatus to each of the plurality of target controllers.

11. The vehicle according to claim 10, wherein the integrated firmware comprises one authentication information item about all the plurality of firmwares.

12. The vehicle according to claim 11, wherein the integrated firmware is transmitted through the diagnostor in the form of update message; and wherein the update message comprises a header.

13. The vehicle according to claim 12, wherein the header comprises at least one of a header version, integrated firmware identification information, firmware number information indicating the number of the plurality of firmwares, corresponding controller identification information for each firmware, message length information, and separate firmware version information.

14. The vehicle according to claim 10, wherein the encryption keys for the controllers that correspond to the plurality of firmwares, respectively, are stored in a security module of the firmware integrated management apparatus.

15. The vehicle according to claim 10, wherein each of the plurality of target controllers decrypts the encrypted firmware by using the encryption key transmitted to each of the plurality of target controllers and then performing reprogramming when the firmware transmitted to each of the plurality of target controllers is encrypted.

16. The vehicle according to claim 10, wherein the firmware integrated management apparatus periodically checks firmware integrity of each of the plurality of target controllers.

17. The vehicle according to claim 16, wherein the firmware integrated management apparatus re-transmits firmware corresponding to a controller with a problem in terms of check of the firmware integrity among the plurality of encrypted firmwares, to the controller with the problem among the plurality of target controllers.

* * * * *